Patented Aug. 21, 1951

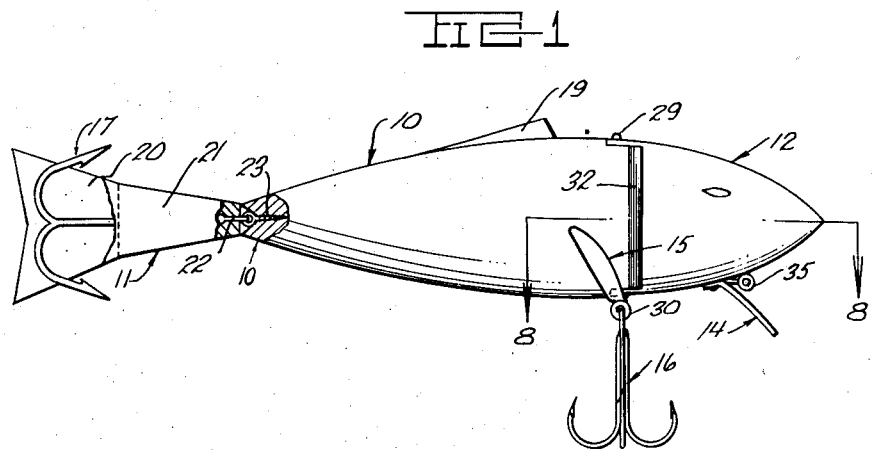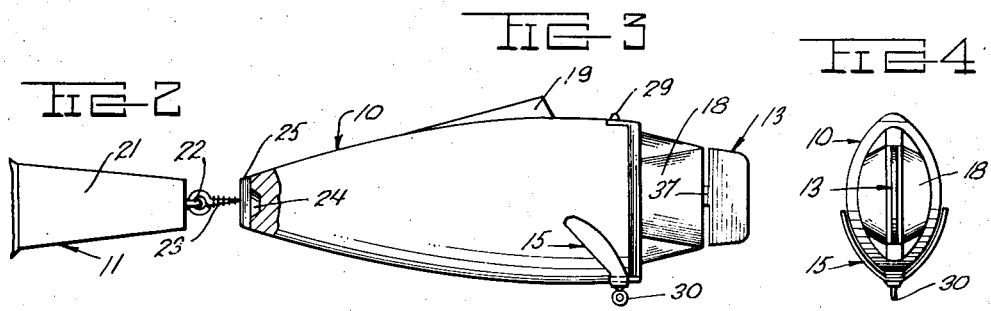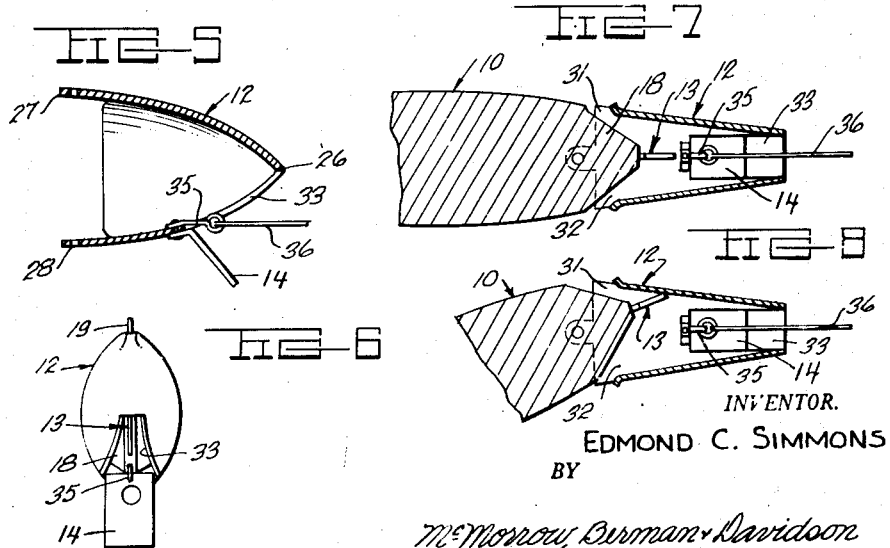

2,565,099

UNITED STATES PATENT OFFICE 2,565,099

FISH LURE

Edmond C. Simmons, Homer, Ky.

Application July 19, 1949, Serial No. 105,638

2 Claims. (Cl. 43—42.06)

This invention relates to fish lures, and more particularly to an artificial minnow type of lure for use in casting for certain types of game fish.

It is among the objects of the invention to provide a fish lure of simplified and durable construction which closely simulates, in appearance, an aquatic creature, such as a minnow, normally providing food for game fish, which has two or more separate parts inter-connected in end-to-end relationship and relatively movable by the action of the water flowing past the lure as the lure is being retrieved after a cast, to produce a natural and life-like swimming action of the lure, which includes means for partially concealing or obscuring the hooks attached to the lure, and which is of a size and weight to facilitate casting, and is neat and attractive in appearance.

Other objects and advantages will become apparent from a consideration of the following description and the appended claims in conjunction with the accompanying drawing, wherein:

Figure 1 is a side elevation of a fish lure illustrative of the invention;

Figure 2 is a side elevation of a fragmentary portion of the tail part of the lure shown separated from the main body part;

Figure 3 is a side elevation of the main body part of the lure, a portion being broken away and shown in cross-section to better illustrate the construction thereof;

Figure 4 is a front end elevation of the main body portion of the lure;

Figure 5 is a longitudinal medial cross-section of the head portion of the lure;

Figure 6 is a front elevation of the assembled lure;

Figure 7 is a longitudinal cross-section of a fragmentary portion of the lure taken substantially on the line 8—8 of Figure 1; and Figure 8 is a cross-sectional view similar to Figure 7 showing the illustrated parts of the lure in a different operative position from that illustrated in Figure 7.

With continued reference to the drawing, the improved lure comprises, in general, a main body 10, a tail 11 pivotally connected at its forward end to the rear end of the main body, a head 12 pivotally connected at its rear end to the front end of the main body, a vane 13 carried by the main body 10 at the front end thereof and disposed within the head 12, a scoop 14 carried by the head, a pair of simulated lateral fins 15, a triple hook 16 pivotally secured to the under side of the lure substantially at the juncture between the head 12 and the main body 10, and a double hook 17 incorporated in the tail 11. A double hook may be substituted for the triple hook 16, if desired.

The main body 10 is preferably solid and formed of some suitable light weight material, such as wood, although it may be made of other materials and may be made hollow, if desired, without in any way exceeding the scope of the invention. This main body has, at its front end, a forwardly-extending wedge-shaped portion 18, the narrow front end of which is substantially straight and extends substantially perpendicular to the longitudinal center line of the body from the upper toward the lower side of the body. This wedge-shaped portion 18 is preferably integral at its base with the remainder of the body 10, and such remainder of the body tapers gradually and preferably, convexly from the base of the wedge-shaped portion 10 to the rear end of the body. This tapered portion of the body has a rounded, substantially elliptical cross-sectional shape and a fixed dorsal fin 19 projects upwardly from the upper side of the body between the base of the wedge-shaped portion 18 and the rear end of the body.

The tail 11 may conveniently comprise two flat plates 20 of elongated, substantially triangular shape disposed at respectively opposite sides of the double hook 17 and enclosing the major portion of the shank of hook with the points of the hook protruding at the opposite edges of these plates, and a binding 21 of thin metal or other suitable material surrounding the two plates 20 near their smaller ends to hold the plates and hooks 17 in assembled relationship. A screw eye 22 is secured in the smaller end of the tail 11 and interlinked with a screw eye 23 secured in the rear end of the main body 10, the main body being provided in its rear end with a recess 24 which receives the eyes of the screw eyes 22 and 23. The main body is also provided in its rear end with a transversely-extending notch 25 in which the narrow front end of the tail fits, so that the tail is held in position such that the surfaces of the plates 20 are substantially parallel to a longitudinal, medial plane of the body 10 extending through the upper and lower sides of the body, but is free to move in a side-to-side manner relative to the body.

The head 12 is a hollow, thin-walled structure having an open rear end and having side walls and top and bottom walls which taper toward the front end of the body, the top and bottom walls being convexly curved, so that they come together at the front end or nose 26 of the head structure.

Apertured lugs 27 and 28 extend rearwardly from the head structure at the upper and lower sides, respectively, of the structure and are pivotally secured to the main body 10 at the upper and lower sides of the latter and adjacent the base of the wedge-shaped portion 18. The upper lug 27 is secured to the main body by pivot pin 29, and the lower lug 28 is pivotally secured to the main body by a screw eye 30 which also attaches the fin 15 to the main body and carries the treble hook 16.

The side walls of the head are cut away or recessed between the lugs 27 and 28 to provide simulated gill openings between the rear ends of the side walls of the head and the corresponding sides of the wedge-shaped portion 18 of the main body, as indicated at 31 and 32 in Figures 7 and 8.

The head 12 has a large, preferably rectangular opening 33 in its lower side extending from the nose 24 rearwardly for a part of the length of the lower or under side of the head, and the scoop 14 is attached at one end to the head at the rear end of the opening 33 and projects downwardly and forwardly relative to the head to direct water into the head through the inlet opening 33, this water flowing out of the head through the gill openings 31 and 32. A line-attaching eye 35 is also secured to the head at the rear end of the opening 33 and extends somewhat forwardly of the scoop 14 for attachment of the fishing line 36 to the lure.

The vane 13 is a generally rectangular, thin plate of suitable material, such as metal, secured to the main body 10 by a stem 37 extending from the rear edge of the vane into the narrow front end of the wedge-shaped portion 18 of the main body, the vane being positioned parallel to the front end of the wedge-shaped portion 18 and substantially parallel to a plane extending from the upper to the lower side of the main body 10 through the longitudinal center line of the body. This vane is disposed within the head 12 to the rear of the opening 33 when the head is operatively mounted on the body, and is actuated by the flow of water through the head from the opening 33 to the gill openings 31 and 32 to relatively swing the head 12 and body 10 alternatively in opposite directions about the common axis of the pivotal connections between the lugs 27 and 28 and the main body 10.

Water flowing into the head through the opening 33, as the lure is being retrieved through the water after a cast, will cause the vane 13 to move to one side of the head causing the head and body to be angularly disposed in one direction relative to each other. This condition, with the body 10 acting as an angularly-disposed rudder, will cause the lure to start to travel in an arc against the pull of the line 36. As soon as the angle between the direction of travel of the lure and the direction of pull of the line becomes sufficiently small, the head will be swung relative to the lure in the opposite direction, the vane 13 will swing over to the opposite side of the head, and the lure will then tend to travel in an arc in the opposite direction until the head is again swung back by the pull of the line. As the forces on the vane 13 are fairly well balanced, both of the gill openings 31 and 32 being open at all times, as is clearly illustrated in Figure 8, the amplitude of the alternative arcuate movements of the lure is relatively small and the lure appears to have a natural, life-like swimming action when moving through the water. This illusion is increased by the action of the tail 11 as the tail swings from side-to-side in response to swinging movements of the rear end of the main body 10.

The fin structure 15 is a somewhat U-shaped member of thin material, such as metal, loosely secured at its mid-length location to the main body 10 by the screw eye 30 and inclining upwardly and rearwardly from such connection. This loose connection permits a limited freedom of movement of the fin structure in the water, and the fin structure causes a sufficient amount of turbulence to obscure the triple hook 16 suspended from the body by the screw eye 30.

The size of the lure will be such as to simulate the size and shape of a minnow which would be used as food by the type of game fish being sought, and the surface of the lure will be decorated to closely simulate the appearance of a particular kind of minnow common to the water in which the lure is being used.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A fish lure comprising an elongated body having a wedge-shaped portion at its front end and tapering rearwardly from the base of such wedge-shaped portion, a hollow head receiving said wedge-shaped portion and pivotally connected at its rear end to said body at the base of said wedge-shaped portion by oppositely-disposed pivotal connections located respectively at the upper and lower sides of said body, said head having recesses disposed between said pivotal connections at the respectively opposite sides of the rear end thereof and also having a water-inlet opening in its lower side and near the front end thereof, a scoop extending forwardly and downwardly from said head at the rear end of said inlet opening to direct water into said head through said opening, said recesses at the rear end of said head providing openings for the outlet of said water, and a vane carried by said wedge-shaped portion at the front end thereof and disposed within said head in the path of water flowing through the head, said vane extending substantially from the upper to the lower side of the head and actuated by the flow of water through said head to alternatively pivot said body and said head in opposite directions about the pivotal connections between said head and said body.

2. A fish lure comprising an elongated body having a wedge-shaped formation at its front end and tapering rearwardly from the base of such wedge-shaped formation, a hollow head receiving said wedge-shaped formation and pivotally connected at its rear end to said body at the base of said wedge-shaped formation by oppositely-disposed pivotal connections located respectively at the upper and lower sides of said body, said head having recesses disposed between said pivotal connections at the respectively opposite sides of the rear end thereof and also having a water-inlet opening in its lower side and near the front end thereof, a scoop extending forwardly and downwardly from said head at the rear end of said inlet opening to direct water into said head through said opening, said recesses at the rear end of said head providing openings for the outlet of said water, a vane carried by said wedge-shaped portion at the front end thereof and disposed within said head in the path of water flowing through the head, said vane extending substantially from the upper to the lower side of the head and actuated by the flow of water through said head to alternatively pivot said body and said head in opposite directions about the pivotal connections between said head and said body, a hook suspended from the lower side of said body at the base of said wedge-shaped formation, and a U-shaped fin structure loosely secured substantially at its mid-length location to said body adjacent the location at which said hook is suspended from said body.

EDMOND C. SIMMONS.

REFERENCES CITED

The following references are of record in the file of this patent:

UNITED STATES PATENTS

| Number | Name | Date |
|---|---|---|
| 1,441,059 | Brown | Jan. 2, 1923 |
| 1,707,407 | Miles | Apr. 2, 1929 |